US012633598B2

(12) United States Patent
Wendling et al.

(10) Patent No.:     US 12,633,598 B2
(45) Date of Patent:          May 19, 2026

(54) ELECTROCHEMICAL CELL WITH ANODE MATERIAL IN PROTRUSION

(71) Applicant: Energizer Brands, LLC, St. Louis, MO (US)

(72) Inventors: Matthew T. Wendling, St. Louis, MO (US); George Zheng, St. Louis, MO (US)

(73) Assignee: Energizer Brands, LLC, St. Louis, MO (US)

( * ) Notice: Subject to any disclaimer, the term of this patent is extended or adjusted under 35 U.S.C. 154(b) by 504 days.

(21) Appl. No.: 18/309,196

(22) Filed: Apr. 28, 2023

(65)          Prior Publication Data
US 2024/0363931 A1      Oct. 31, 2024

(51) Int. Cl.
    *H01M 50/107*      (2021.01)
    *H01M 4/02*        (2006.01)
    *H01M 4/48*        (2010.01)
    *H01M 10/04*       (2006.01)
    *H01M 50/469*      (2021.01)

(52) U.S. Cl.
    CPC ........... H01M 50/107 (2021.01); H01M 4/48 (2013.01); H01M 10/0422 (2013.01); H01M 50/469 (2021.01); *H01M 2004/027* (2013.01)

(58) Field of Classification Search
    CPC .... H01M 50/107; H01M 50/469; H01M 4/48; H01M 10/0422
    See application file for complete search history.

(56)          References Cited

U.S. PATENT DOCUMENTS 11,588,158 B2      2/2023   Mark
    2019/0273266 A1*   9/2019   Mark ................... H01M 6/085

FOREIGN PATENT DOCUMENTS

JP          2021157976 A  * 10/2021   .......... H01M 10/052

* cited by examiner

*Primary Examiner* — Karie O'Neill Apicella
(74) *Attorney, Agent, or Firm* — Alston & Bird LLP

(57)          ABSTRACT

An electrochemical cell comprises a can comprising a cylindrical side wall extending from a closed end wall, the closed end wall defining a protrusion with a protrusion cavity therein; and a separator positioned within the can and defining an inner cavity and separating the inner cavity from an outer cavity defined by the can and the separator. The inner cavity extends into the protrusion cavity. The electrochemical cell further comprises a cathode electrode material disposed in the outer cavity; and a anode electrode material disposed in at least a portion of the inner cavity.

20 Claims, 5 Drawing Sheets

ELECTROCHEMICAL CELL WITH ANODE MATERIAL IN PROTRUSION

TECHNOLOGICAL FIELD

Embodiments relate to an electrochemical cell having a pip protrusion on an external end of the electrochemical cell and having anode material disposed within the pip protrusion.

BACKGROUND

Cylindrical alkaline, primary electrochemical cells are typically constructed in a "bobbin-style" configuration, with an annular ring of cathode material lining the interior surface of the electrochemical cell container. The interior of the cathode ring is lined with a separator material that defines the anode-cathode interface of the cell, and the interior of the separator is filled with an anode material. The anode material expands as environmental temperature increases, as a result of a chemical reaction occurring within the electrochemical cell, and/or due to other factors. As the anode material expands, it applies an expanding pressure on the anode-cathode interface of the electrochemical cell. With high enough pressure, the separator material may fail, creating short circuits within the electrochemical cell. These short circuits can lead to premature voltage drop-off of the cell. Through applied effort, ingenuity, and innovation many deficiencies of such conventional electrochemical cells have been solved by developing solutions that are structured in accordance with the example embodiments disclosed herein.

BRIEF SUMMARY OF SOME EXAMPLE EMBODIMENTS

Various example embodiments provide an electrochemical cell (e.g., a battery) having increased discharge efficiency. Various example embodiments provide an electrochemical cell with increased cathode electrode material volume. In various example embodiments, the electrochemical cell is a AA, AAA, C, D, LR6, LR03, LR14, LR20 and/or other battery size having a pip protrusion or other protrusion. In an example embodiment, an inner cavity of the electrochemical cell extends at least partially into the protrusion. For example, anode material may be disposed within at least part of the protrusion, in an example embodiment. In another example embodiment, at least part of the protrusion provides an expansion region into which electrode material (e.g., anode material, electrolyte material, and/or the like) may expand. For example, the partial filling of the protrusion with electrode material may reduce the pressure on the anode-cathode interface of the electrochemical cell, which may lead to improved electrochemical cell performance. Additionally, the presence of a cathode electrode material in a first portion of the protrusion and a anode electrode material in a second portion of the protrusion may increase the interfacial area between the cathode electrode material and the anode electrode material. In an example embodiment, the electrochemical cell is an alkaline electrochemical cell. In an example embodiment, the electrochemical cell comprises a anode electrode material including electrolyte material and anode material, where at least one of the electrolyte material and the anode material includes zinc oxide (ZnO) and/or zinc hydroxide (Zn(OH)$_2$).

In accordance with a first aspect of the disclosure, an electrochemical cell is provided. In an example embodiment, the electrochemical cell includes a can comprising a cylindrical side wall extending from a closed end wall. The closed end wall comprises a protrusion with a protrusion cavity therein. The electrochemical cell further includes a separator positioned within the can and defining an inner cavity and separating the inner cavity from an outer cavity defined by the can and the separator. The inner cavity extends into the protrusion cavity. The electrochemical cell further includes a cathode electrode material disposed in the outer cavity; and a anode electrode material different than the cathode electrode material disposed in at least a portion of the inner cavity.

In accordance with another aspect of the disclosure, an electrochemical cell is provided. In an example embodiment, the electrochemical cell comprises a can comprising a first cylindrical side wall extending from a closed end wall. The closed end wall comprises a protrusion with a protrusion cavity therein. The electrochemical cell further includes a separator positioned within the can comprising a bottom surface. The bottom surface of the separator is convex and extends into the protrusion cavity. The separator defines an inner cavity and separates the inner cavity from an outer cavity defined by the can and the separator. The electrochemical cell further includes a cathode electrode material disposed in the outer cavity; and a anode electrode material different than the cathode electrode material disposed in at least a portion of the inner cavity.

In accordance with another aspect of the disclosure, a method for manufacturing an electrochemical cell is provided. In an example embodiment, the method comprises providing a can comprising a cylindrical side wall extending from a closed end wall, the closed end wall comprising a protrusion with a protrusion cavity therein; inserting material comprising cathode electrode material into the can to form an electrode material ring; and inserting a separator into the electrode material ring. The separator includes a convex bottom surface that extends into the protrusion cavity. The method further comprises placing anode electrode material into an inner cavity defined by the separator; and sealing a first end of the can opposite the second end.

BRIEF DESCRIPTION OF THE DRAWINGS

Figure 1:
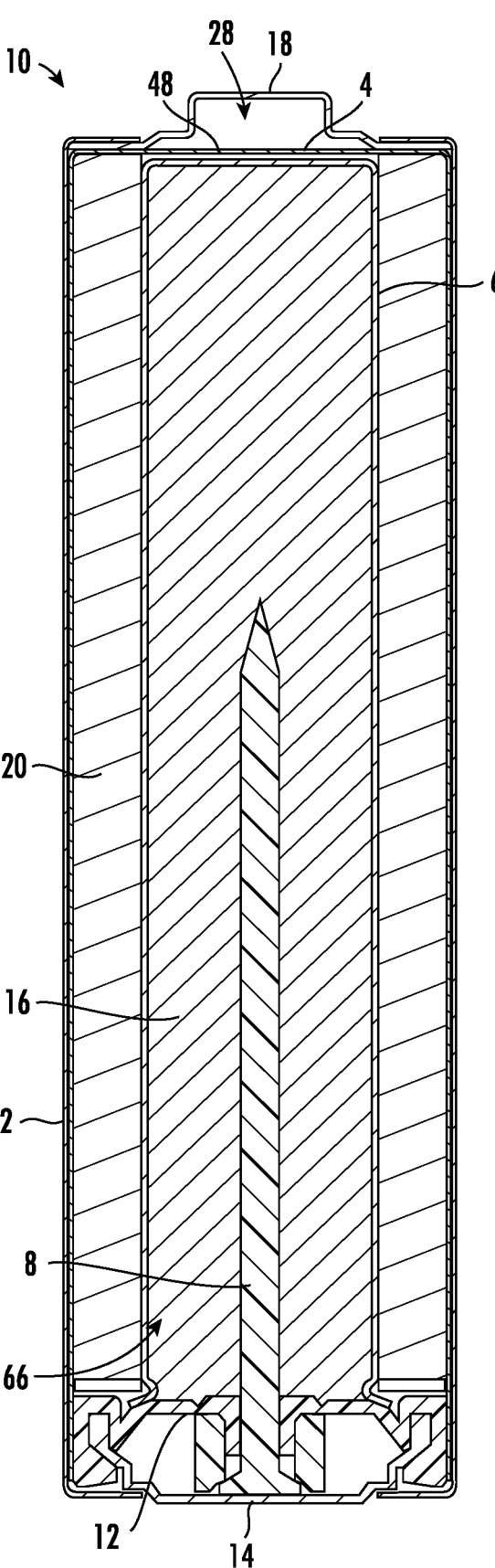
Figure 2:
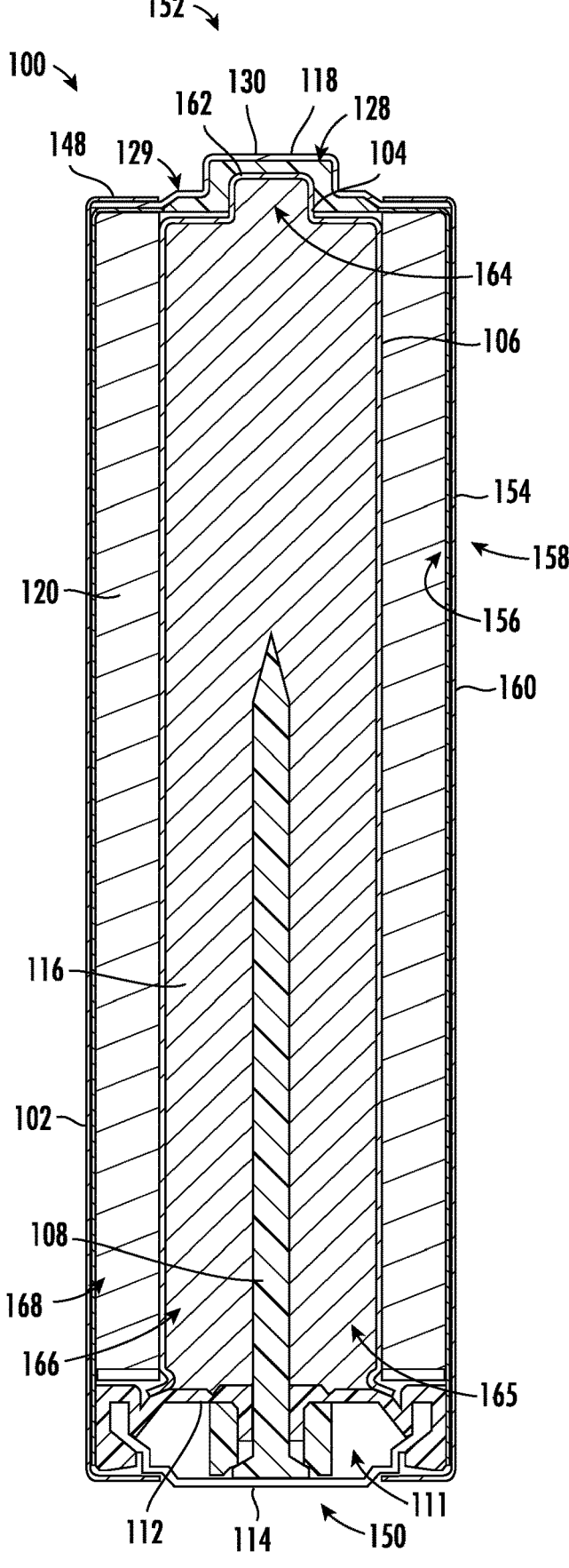
Figure 3:
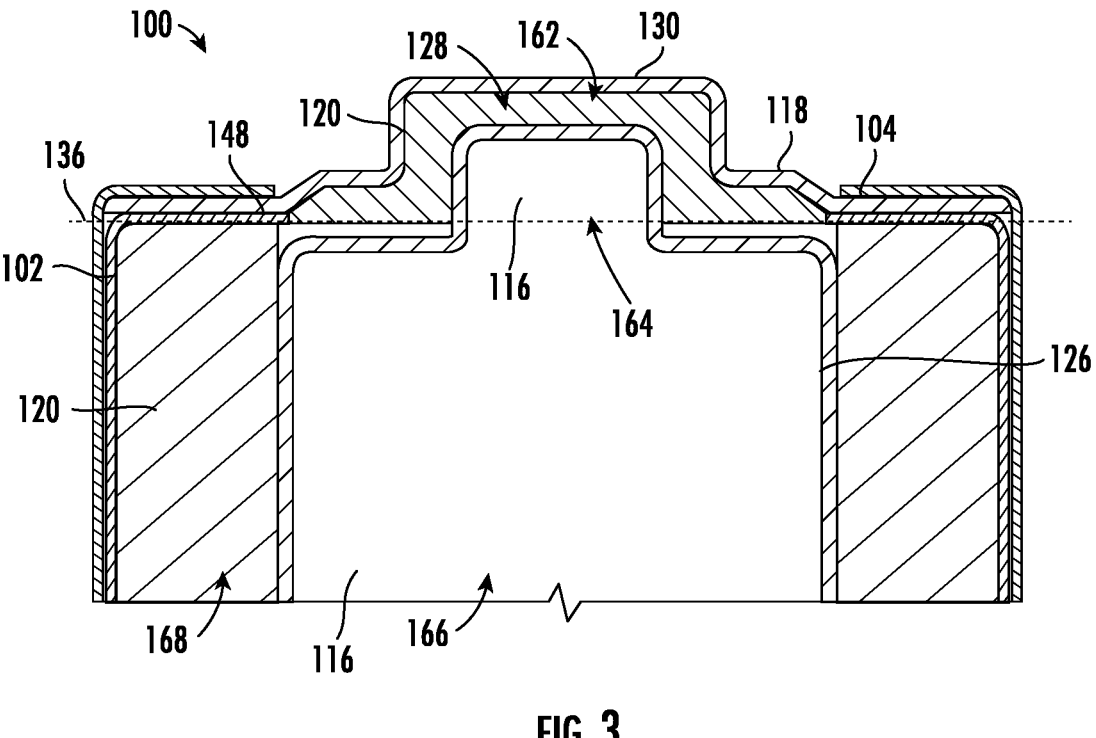
Figure 4:
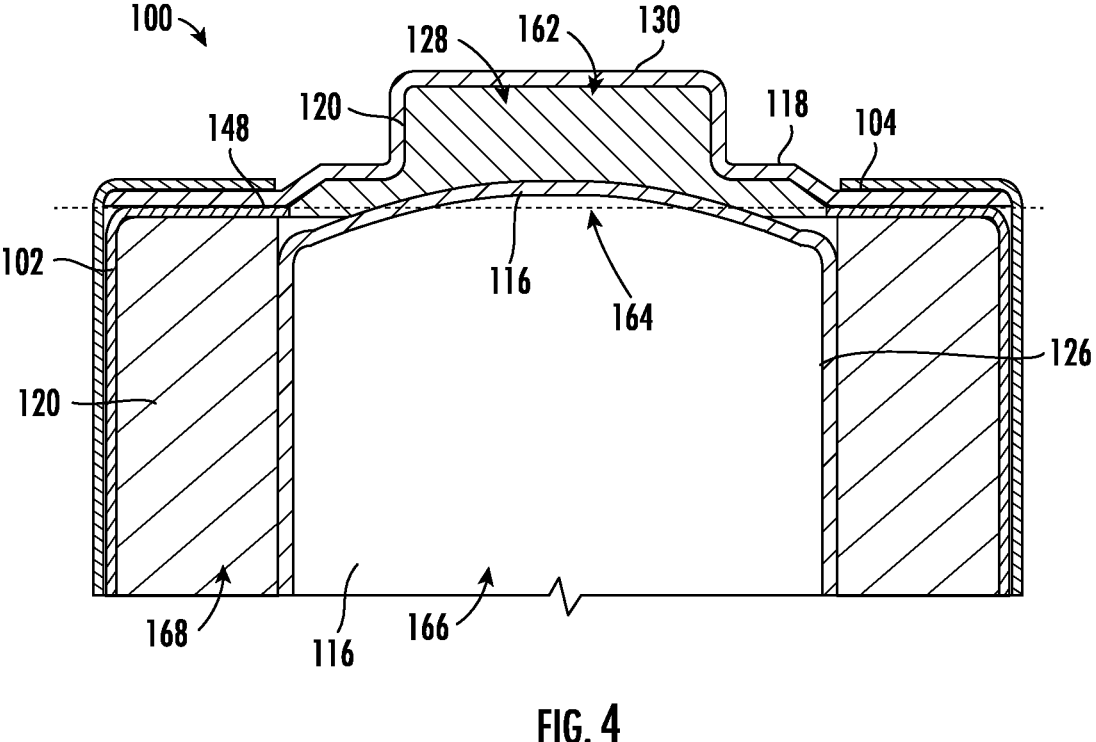
Figure 5:
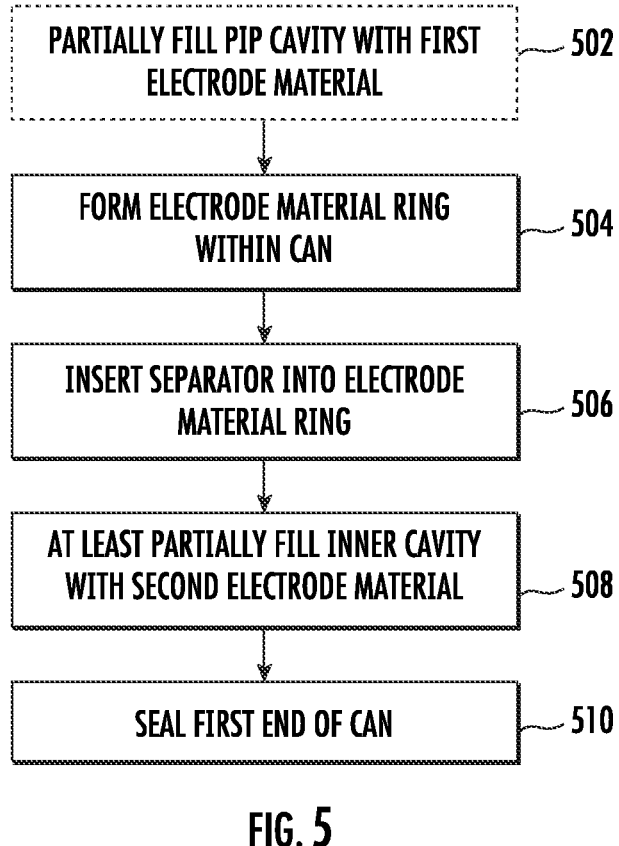

Having thus described certain example embodiments in general terms, reference will hereinafter be made to the accompanying drawings, which are not necessarily drawn to scale, and wherein:

FIG. 1 is a cross-sectional view of a related-art electrochemical cell;

FIG. 2 is a cross-sectional view of an example embodiment of a electrochemical cell according to an example embodiment;

FIG. 3 is a close-up cross-sectional view of the protrusion portion of the electrochemical cell show in FIG. 2;

FIG. 4 is a close-up cross-sectional view of the protrusion portion of another example embodiment of an electrochemical cell according to an example embodiment; and FIG. 5 is a flowchart illustrating example processes and procedures for manufacturing an electrochemical cell according to an example embodiment.

DETAILED DESCRIPTION

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "approximately," "generally," and similar terms are used to indicate that the corresponding item is within appropriate manufacturing and/or engineering tolerances. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives.

To the extent they are not explicitly mutually inconsistent, each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths, hundredths, thousandths, ten-thousandths, and hundred-thousandths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 7-10%, 5.1%-9.9%, and 5.01%-9.99%. As another example, "0.00001-1 M" includes 0.00005-0.0001 M and 0.001-0.01 M.

As used herein, "about" in the context of a numerical value or range means within ±10% of the numerical value or range recited or claimed.

As used herein, "run-time" refers to the length of time that an electrochemical cell will be able to provide a certain level of charge.

Unless otherwise specified, as used herein the terms listed below are defined and used throughout this disclosure as follows:

Anode—the negative electrode, to serve as the primary electrochemically active material, with an example main active material being Zinc.

Capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of minutes or images taken on the digital still camera (DSC) test. As discussed herein, Capacity may be expressed and/or measured for low-rate discharge or high-rate discharge.

Cathode—the positive electrode; in some embodiments, the active material of cathode may be manganese dioxide ($MnO_2$), such as electrolytic manganese dioxide (EMD).

Cell housing—the structure that physically encloses the electrode assembly (e.g., the anode, cathode, separator, and current collector(s)). The cell housing comprises all internally enclosed safety devices, inert components and connecting materials which comprise a fully functioning battery; typically these will include a container (formed in the shape of a cup, also referred to as a "can" or a "receptacle") and a closure (fitting over the opening of the container and normally including venting and sealing mechanisms for impeding electrolyte egress and moisture/atmospheric ingress); depending upon the context may sometimes be used interchangeably with the terms can or container. In various embodiments, the closed end of the cup-shaped container has a protrusion (e.g., a pip protrusion) extending outward therefrom and/or welded thereto.

Cylindrical cell size—any cell housing having a circular-shaped cylinder with a height that is greater than its diameter.

Electrochemically active material—one or more chemical compounds that are part of the discharge reaction of a cell and contribute to the cell discharge capacity, but including impurities and small amounts of other moieties inherent to the material.

LR6 or AA-sized cell—With reference to International Standard IEC-60086-1 published by the International Electrotechnical Commission after November 2000, a cylindrical cell size zinc-manganese dioxide ($Zn$—$MnO_2$) battery with a maximum external height of about 50.5 mm and a maximum external diameter of about 14.5 mm.

LR03 or AAA-sized cell—With reference to International Standard IEC-60086-1 published by the International Electrotechnical Commission after November 2000, a cylindrical cell size zinc-manganese dioxide ($Zn$—$MnO_2$) battery with a maximum external height of about 44.5 mm and a maximum external diameter of about 10.5 mm.

Interfacial area—surface area between the anode and the cathode. The interfacial area is covered by a separator to electrically separate the anode from the cathode.

FIG. 1 illustrates a battery 10, such as a LR6 or LR03 battery. The battery 10 has, in the illustrated embodiment, a housing that includes a container in the form of a can 2 with a closed end (e.g., formed by the can end wall 48) and an open end that is closed with a battery cover 14 and a vented seal 12. Historically, the closed end of the can 2 is planar across the entirety of the closed end. The can 2 has a bead or reduced diameter step near the open end to support the vented seal 12 and cover 14. The vented seal 12 is compressed between the can 2 and the cover 14 to seal anode or negative electrode material 16, cathode or positive electrode material 20, and electrolyte within the battery 10. For example, the battery 10 comprises a can 2 and a separator 6 comprising a bottom cup 4. anode electrode material 16 is disposed within an inner cavity 66 defined by the separator 6 and the bottom cup 4 and enclosed by the vented seal 12. A collector 8 extends into the anode electrode material 16 and is in electrical connection with a negative cover 14. Positive electrode material 20 is disposed in an annular shape between the sidewalls of the can 2 and the separator 6. A positive cover 18 having a positive pip terminal is attached (e.g., spot welded) to the planar can end wall 48 of the can 2 opposite the negative cover 14. As shown in FIG. 1, the positive cover 18 has a diameter at least substantially equal to the diameter of the cell can 2. The positive cover 18 has an at least substantially planar outer edge portion that may be welded or otherwise secured onto the planar closed end of the cell can 2. The positive cover also defines a positive pip terminal defines a protrusion cavity 28 inside the innermost edge of of the planar outer edge portion of the positive cover. The positive pip terminal is located at a center of the positive cover and defines a cylindrical portion (having an at least substantially planar outermost surface) at the center of the positive cover. Surrounding the cylindrical portion is a transitional region between the planar outer edge portion and the cylindrical portion. The outermost surface of the cylindrical portion is raised relative to the planar outer edge portion to define the protrusion cavity 28 that is filled with air and is located external to the can 2. The can end wall 48 separates and/or isolates the protrusion cavity 28 from the bottom cup 4 of the separator 6 and the cathode electrode material 20. In some instances, the positive cover 18 has the positive pip terminal integrally formed with the can 2 such that the protrusion cavity is located within the interior of the can 2. However, historically these protrusion cavities are still typically filled with inactive fluid (c . . . g, air, electrolyte, gasses, vapor, or void).

Example Embodiments of an Electrochemical Cell

FIGS. 2, 3, and 4 are schematic illustrations of example cylindrical electrochemical cells 100 (referred to as cells 100 herein) having cathode and anode material positioned within a protrusion cavity of a positive pip terminal. In example embodiments, the cell 100 is a primary alkaline cell. In various embodiments, the cell 100 comprises a container in the form of can 102 that has a closed end and an opposite open end with a generally cylindrical side wall 154 extending from the closed end wall 148 at the closed end of the can 102 to the open end of the can. A separator 106 disposed within the interior of the can 102 separates the interior volume of the can 102 into an inner cavity 166 and an outer cavity 168. Cathode electrode material 120 is enclosed within the outer cavity 168 and anode electrode material 116 is enclosed within the inner cavity 166 via seal 112 and cover 114.

The cell is generally cylindrical, and has a size provided according to one of the defined standard cylindrical cell sizes, such as: C, D, LR6, LR03, LR14, LR20, or other standardized size. As shown, the cell can defines a protrusion 130 on an end of the cell. According to standard cylindrical cell constructions, the protrusion 130 is a positive pip protrusion. For example, the protrusion 130 forms at least a portion of the positive terminal of the cell 100. For example, the cell 100 may be a bobbin-style electrochemical cell, according to one embodiment.

For example, the cell 100 comprises cathode electrode material 120 (e.g., positive electrode material). For example, the cathode electrode material 120 is in electrical contact with the positive terminal of the cell 100, in various embodiments. In an example embodiment, the closed end wall 148 and/or the pip protrusion 130 forms at least a portion of the positive terminal of the cell 100. In some embodiments, the cathode electrode material 120 may be formed of a mixture of manganese dioxide ($MnO_2$) (e.g., electrolytic manganese dioxide (EMD)), graphite, potassium hydroxide (KOH) solution, silicon dioxide, alkaline electrolyte solution (e.g., catholyte), and/or additives, according to one embodiment. In some embodiments, other cathode materials may be used. In an example embodiment, the cathode electrode material 120 comprises is 80-92% (by weight) EMD. In various embodiments, EMD is present in an amount generally from about 81 to 85% (by weight) based on the total weight of the positive electrode, i.e., manganese dioxide, conductive material, positive electrode electrolyte and additives, including organic additive(s), if present. The cathode can also contain small amounts of one or more additional active materials, depending on the desired cell electrical and discharge characteristics. The additional active cathode material may be any suitable active cathode material. Examples include metal oxides, $Bi_2O_3$, $C_2F$, $CF_x$, $(CF)_n$, $CoS_2$, CuO, CuS, FeS, $FeCuS_2$, $MnO_2$, $Pb_2Bi_2O_5$ and S.

Additionally, the cell 100 comprises anode electrode material 116, such as anode or negative electrode material. For example, the anode electrode material 116 is in electrical contact with the negative electrode terminal of the cell 100. In an example embodiment, the cover 114 forms at least a portion of the negative terminal of the cell 100. The anode includes a mixture of one or more active materials, an electrically conductive material, optionally solid zinc oxide, and a surfactant. The negative electrode can optionally include other additives, for example a binder or a gelling agent, and the like. Zinc is an example main active material for the negative electrode of the embodiments. Preferably, the volume of active material utilized in the negative electrode is sufficient to maintain a desired particle-to-particle contact and a desired anode to cathode (A:C) ratio. In some embodiments, the anode may comprise micron-scale Zinc particles suspended in a gelled electrolyte of concentrated potassium hydroxide (KOH) in water.

In various embodiments, the anode electrode material 116 includes electrolyte material and anode material, where the electrolyte material and/or the anode material include ZnO and/or zinc hydroxide ($Zn(OH)_2$). In an example embodiment, the anode or negative electrode material comprises and/or is formed of zinc powder, solid zinc, an alkaline electrolyte solution (e.g., an alkaline metal hydroxide electrolyte and dissolved zinc oxide and/or zinc hydroxide), solid zinc oxide particles, solid zinc hydroxide particles, zinc oxide and/or zinc hydroxide dissolved in the anolyte, one or more compounds that produce zincate ions ($Zn(OH)_4^{2-}$) when dissolved, a gelling agent, and/or additives, in an example embodiment. Other anode materials may be used, and the anode may be coated, adhered to or otherwise physically attached to another component, such as a separate current collector 108, the separator 106, and/or the can 102.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore S. A., Brussels, Belgium is an example of a zinc supplier. In a preferred embodiment, the zinc powder generally has 25 to 40 percent fines less than 75 μm, and preferably 28 to 38 percent fines less than 75 μm. Generally, lower percentages of fines will not decrease DSC service and higher percentages of fines can lead to increased gassing. A correct zinc alloy is needed in order to reduce negative electrode gassing in cells and to maintain test service results.

A surfactant that is either a nonionic or anionic surfactant, or a combination thereof is usually present in the anode. It has been found that anode resistance is increased during discharge by the addition of solid zinc oxide alone, but is mitigated by the addition of the surfactant. The addition of the surfactant increases the surface charge density of the solid zinc oxide and lowers anode resistance.

As described above, the cathode electrode material 120 and the anode electrode material 116 may include electrolytes. For example, an electrolyte such as potassium hydroxide (KOH), containing water only in very small quantities as a contaminant (e.g., no more than about 500 parts per million by weight, depending on the electrolyte salt being used), is used in the cell 100. The electrolyte may additionally comprise an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Electrolytes that are less alkaline are preferred, but can lead to rapid electrolyte separation of the anode. Increase of alkaline metal hydroxide concentration creates a more stable anode, but can reduce high-rate service. In some embodiments having solid ZnO designs, the dissolved ZnO concentrations may be increased significantly. The metal ions in the electrolyte can have a concentration of 0.1-60,000 ppm. In alternate embodiments, the electrolyte may be neutral or salt-based, as in a zinc-carbon cell. In an example embodiment, the electrolyte of the anode electrode material 116 (e.g., the anolyte) includes ZnO and/or zinc hydroxide ($Zn(OH)_2$).

In various embodiments, the cell 100 comprises a separator 106 disposed within the can 102 to separate the outer cavity 168 (e.g., containing cathode electrode material 120) from the inner cavity 166 (e.g. containing anode electrode material 116). For example, the separator 106 is configured to maintains a physical dielectric separation of the positive electrode's electrochemically active material from the electrochemically active material of the negative electrode and allows for transport of ions between the electrode materials. In various embodiments, the separator 106 is formed of a hollow cylinder having an open end. For example, in various embodiments, the separator 106 includes a cylindrical separator wall 126 that extends from a bottom surface 104.

In addition to maintaining separation of the cathode electrode material 120 and the anode electrode material 116, the separator acts as a wicking medium for the electrolyte and as a collar that prevents fragmented portions of the negative electrode from contacting the top of the positive electrode. In various embodiments, the separator 106 is a layered ion permeable, non-woven fibrous fabric. A separator 106 may have one layer or two or more layers. Conventional separators are usually formed either by pre-forming the separator material into a cup-shaped basket that is subsequently inserted into an opening defined by the first electrode material 120. Conventional pre-formed separators are typically made up of a sheet of non-woven fabric rolled into a cylindrical shape configured to conform to the inside walls of an opening in the cathode electrode material 120 and has a closed bottom end formed by the bottom surface 104. Two or more layer separators may be formed by forming a basket during cell assembly by inserting two rectangular sheets of separator into the cavity with the material angularly rotated 90° relative to each other.

In an embodiment, the separator 106 is a low-porosity separator or a laminated separator with a cellophane layer. For example, the separator 106 is a low-porosity separator with the mean pore size less than 12 microns and the maximum pore size less than 30 microns.

In an embodiment, the separator 106 is a bilayer separator with a high-density layer and a low-density layer. In some embodiments, the pore size of the high-density layer may be less than or equal to 1 micron. Without being bound by theory, it is believed that this pore size in the high-density layer reduces shorting in the battery by preventing ZnO reaction product precipitate from creating a conductive network between the electrodes. Further, the low-density layer improves the absorption of electrolytes in order to improve high-rate performance, such as that measured by the DSC test. Further, utilization of a separator with these characteristics results in decreased shorting even when a thinner separator thickness is used. This decrease in separator thickness increases available volume within the cell which can be used for additional active material and/or more additives (e.g., increasing the amount of silicon donor in the anode without adjusting amounts of other materials within the cell).

In an embodiment, the bilayer separator comprises at least one layer comprising pores with a mean diameter of between about 0.3-20 microns. In an embodiment, the pores have a mean diameter of about 1-10 microns, or about 2-8 microns, or about 3-6 microns, or about 4-5 microns, or about 4.5 microns. In an embodiment, the pores have a mean diameter of greater than, less than, or equal to about 1, 2, 3, 4, 5, 6, 7, 8, 9, 10, 11, 12, 13, 14, 15, 16, 17, 18, 19, or 20 microns, or a range between any two of these values. In an embodiment, the pores have a mean diameter of less than or equal to 0.3, 0.4, 0.5, 0.6, 0.7, 0.8, 0.9, 1.0, 1.1, 1.2, 1.3, 1.4, or 1.5 microns.

The cell 100 comprises a container generally shown as can 102. In an example embodiment, the can 102 is cylindrical. In an example embodiment, the can 102 is a steel can. In an example embodiment, the cell 100 is a AA-size electrochemical cell employing a low carbon, aluminum killed, SAE 1006 or equivalent steel with an inside can 102 plating of nickel and cobalt, and an outside plating of nickel. As should be understood, other embodiments of the cell 100 may have various dimensions as appropriate for the application and battery type.

In various embodiments, the can 102 defines a first (or top) end 150, a second (or bottom) end 152, and a cylindrical side wall 154 extending between the first and second ends 150, 152. The second end 152 of the can 102 has a closed end wall 148. The closed end wall 148 is integrally formed with the can 102 during formation of the can 102. The can 102 may be formed by a conventional can formation process, such as a deep drawing process. Alternately, the closed end wall 148 may be connected (e.g., welded) to the second end 152 of the cylindrical side wall 154 to form a can 102.

The can 102 and its closed end wall 148 may be made of any suitable metal or other electrically conductive material that can be formed into a desired shape and can be adapted to seal the contents within the cell 100 to allow the cell to function as described herein. In the embodiment shown in FIG. 2, the can 102 also functions as the cathode current collector, and is electrically conductive. In some embodiments, the internal surface 156 of the can 102 may be coated with a material, such as graphite, that may reduce the internal resistance between the internal surface 156 of the can 102 and the cathode electrode material 120. For example, in some embodiments, the internal surface 156 of the can 102 may be coated with a conductive material to electrically couple the can 102 to the cathode electrode material 120. The external surface 158 of the can 102 may be plated with a material to provide corrosion resistance, high electrical conductivity, and/or an attractive appearance. According to one embodiment, the internal surface 156 of the steel can 102 are plated with one or more metal(s) and heat-treated to improve these characteristics. According to one embodiment, the cylindrical side wall 154 and closed end wall 148 of the can 102 have a thickness in the range of about 0.005 inch to 0.014 inch (0.13 milliliters to 0.36 millimeters) thick. The can 102, cylindrical side wall 154 and closed end wall 148 may have the same or different thicknesses, coatings and/or platings.

A first contact terminal 118 (e.g., a positive contact terminal, in an example embodiment) is formed as a part of the closed end wall 148 at the second end 152 of the can 102. In an example embodiment, the first contact terminal 118 has a generally uniform thickness and is formed as a part of the can 102. In other embodiments, the closed end 148 with the integrally formed first contact terminal 118 is formed separately and attached (e.g., welded to an end of a cylindrical tube to form the closed end of the can 102. As shown, the first contact terminal 118 has a protruding nubbin 130 (i.e., a pip protrusion or other protrusion) at its center region, which functions as the first contact terminal 118 of the cell 100. The protruding nubbin 130 defines a cylindrical shape having a generally planar top surface. As mentioned, the protruding nubbin 130 is located in a center of the closed end wall 148 of the can 102. That closed end wall 148 defines an at least substantially planar ring portion at an outer edge thereof, extending between an outermost edge of the closed end wall 148 where the closed end wall 148 meets the cylindrical sidewall 154. The closed end wall 148 additionally defines a transitional region between the protruding nubbin 130 and the substantially planar ring portion, where the closed end wall 148 rises from the at least substantially planar ring portion to a bottom end of the protruding nubbin 130. The protrusion cavity is defined within the interior of the protruding nubbin 130 and the transitional region.

In an example embodiment, the first contact terminal 118 is integrally formed with the can 102 and/or is an integral part of the can 102. For example, the closed end wall 148 of the can 102 includes the protrusion 130 and is also the first contact terminal 118. For example, the first contact terminal 118 may be integrally formed with the can 102 when the can 102 is manufactured or may be welded onto the can 102 as the closed end wall 148 of the can. For example, in an example embodiment, the protrusion cavity 128 defined by the protrusion 130 of the first contact terminal 118 is not separated and/or isolated from the separator 106 and/or the cathode electrode material 120.

On the first end 150 of the can 102 is a second contact terminal or cover 114 (e.g., a negative contact terminal or cover, in an example embodiment) which functions as the second contact terminal of the cell 100. The first and second contact terminals 118, 114 are made of electrically conductive material, such as metal, metal alloys, conductive polymers or the like, and form the respective first and second electrical terminals. In an example embodiment, the first contact terminal 118 is the positive contact terminal and forms the positive electrical terminal of the electrochemical cell 100 and the second contact terminal or cover 114 is the negative contact terminal and forms the negative electrical terminal of the electrochemical cell 100. In an example embodiment, the first contact terminal 118 is the negative contact terminal and forms the negative electrical terminal of the electrochemical cell 100 and the second contact terminal or cover 114 is the positive contact terminal and forms the positive electrical terminal of the electrochemical cell 100.

A non-conductive jacket 160 is formed about the exterior surface of the steel can 158, and extends over the peripheral edge of the closed second end 152 of the can 102. The jacket

160 may include a layer such as a metalized, plastic film label, which may serve as an insulator and/or brand identifier or the like.

As noted above, a separator or basket 106 is disposed within the can 102 and defines an inner cavity 166 of the cell 100. An outer cavity 168 of the cell 100 is defined by the can 102 and the separator 106. In an example embodiment, the cross-section of the separator 106 is generally U-shaped, such that the separator comprises a cylindrical separator wall 126 and a bottom surface 104. In an example embodiment, the cylindrical separator wall 126 and the bottom surface 104 define the inner cavity 166 of the cell 100. In various embodiments, the bottom surface 104 is a convex and/or curved surface. For example, FIG. 3 illustrates an example embodiment wherein the bottom surface 104 is a curved surface having an interior protrusion 134 formed therein. In another example, FIG. 4 illustrates an example embodiment wherein the bottom surface 104 is a smoothly-curved convex surface. For example, in various embodiments, the bottom surface 104, and therefore the inner cavity 166 defined by the separator 106 extends into the protrusion cavity 128.

The separator or basket 106 may be formed of a non-woven fabric that prevents migration of solid particles of a predetermined size within the cell 100, and these terms (i.e., separator and basket) are used synonymously herein. Also, other separator materials may be used to form the separator 106, including but not limited to porous and microporous polymeric sheets, ceramics, woven materials or any other material or combination of materials that are compatible with the electrodes and electrolyte and that create an ionically permeable, physical barrier between the electrodes that allows the cell 100 to function as described herein.

Anode electrode material 116 is also disposed within the can 102 inside of the separator 106. For example, the anode electrode material 116 is disposed within the inner cavity 166 of the cell 100. In some embodiments, the anode electrode material may be coated, adhered to or otherwise physically attached to another component, such as a separate current collector 108 and/or the separator 106 itself.

In various embodiments, the anode electrode material 116 expands during discharge. In order to prevent and/or decrease the pressure applied to the cathode-anode interface of the cell 100 caused by the anode electrode material expansion 116, the cell 100 includes an amount of anode electrode material 116 such that the expanded volume of the anode electrode material during discharge is less than or equal to the volume of the inner cavity 166. The anode electrode material 116 is therefore able to expand by the amount of additional volume provided by the inner protrusion cavity 164 without significantly increasing the pressure on the cathode-anode interface and without decreasing the amount of anode electrode material within the electrochemical cell 100 (e.g., compared to the amount of anode electrode material within the battery 10).

In the illustrated embodiments, cathode electrode material 120 (e.g., cathode or positive electrode material, in an example embodiment) is disposed in the outer cavity 168 and anode electrode material 116 (e.g., anode or negative electrode material, in an example embodiment), is disposed in the inner cavity 166. Due to the convex and/or curved shape of the bottom surface 104 of the separator 106, the inner cavity 166 extends into the pip protrusion cavity 128.

A collector and seal assembly 111 is assembled onto the first or open end of the can 102 for closing the open end of the can 102. The collector and seal assembly shown includes a current collector 108, an annular polymeric (e.g., nylon)

seal 112, and a second contact terminal or cover 114. The current collector 108, which may include a brass or other type of conductive nail/rod having an elongated body and enlarged head, is disposed in contact with the anode electrode material 116 and second contact terminal or cover 114. For example, the current collector 108 has a head disposed at the first end 150 of the can 102 and an elongated body that extends at least part way along the length of the inner cavity 166. The second contact terminal or cover 114 extends across the open end of the can 102 and engages a seal 112 (e.g., a nylon or polymeric seal). The seal 112 may include a ring-shaped polymeric seal having a generally J-shape cross-section, according to one embodiment. The manufacturing of the seal 112 may include the seal 112 being positioned in the open end of the can 102 on top of a bead formed radially inward on the cylindrical side wall 154 of the can 102, or alternately in a flared opening of the can 102, and crimping the upper end of the can 102 inwardly and over the outer periphery of the seal 112 and second contact terminal or cover 114 to compress the seal 112 against the bead. The seal 112 is thereby compressed between the peripheral edge of the second contact terminal or cover 114 and the cylindrical side wall 154 of the can 102.

It should be appreciated that the second contact terminal or cover 114 is electrically insulated from the can 102 by way of the seal 112, which is made of an electrically insulating material. The resulting collector and seal assembly shown provides a low volume closure to the open end of the can 102. It should further be appreciated that other closure assemblies may be employed to seal closed the open first end 150 of the can 102.

Disposed within the can 102 is cathode electrode material 120. In accordance with the disclosure, cathode electrode material 120 may be disposed within the outer cavity 168 and, in an example embodiment, within an outer protrusion cavity 162 of the protrusion cavity 128. In some embodiments, the cathode electrode material 120 may be coated, adhered to or otherwise physically attached to another component, such as a separate current collector, the separator 106 itself, and/or the can 102. As should be understood by a skilled practitioner, the separator 106 physically separates and/or electrically isolates the cathode electrode material 120 from the anode electrode material 116.

As described above, the electrochemical cell 100 defines a protrusion 130. For example, the closed end 148 of the can 102 defines a protrusion 130, in various embodiments. The protrusion 130 surrounds and defines the boundaries of a protrusion cavity 128. The protrusion cavity 128 is further defined by an imaginary plane 136 defined by the second (or bottom) end 152 of the cylindrical side wall 154 and coplanar with the at least substantially planar ring portion of the closed end wall 148.

In various embodiments, the bottom surface 104 of the separator 106 is curved (e.g., convex) such that a portion of the bottom surface 104 of the separator 106, and consequently a portion of the anode electrode material 116, is disposed within the protrusion cavity. For example, a portion of the inner cavity 166 is disposed within the protrusion cavity 128. For example, as shown in FIGS. 3 and 4, the bottom surface 104 of the separator 106 is convex such that it crosses the imaginary plane 136 that is coplanar with the at least substantially planar outer portion of the closed end wall 148 and that defines a portion of the boundary of the protrusion cavity 128.

As shown in FIGS. 3 and 4, the bottom surface 104 of the separator 106 is curved (e.g., convex) such that the bottom surface 104 of the separator 106 divides the protrusion cavity 128 into an inner protrusion cavity 164 and an outer protrusion cavity 162. Different contour shapes may be utilized, as reflected in FIGS. 3 and 4. As an example, the convex curvature may be an at least substantially continuous convex curvature (as shown in FIG. 4). Alternatively, the convex curvature may encompass different slopes (e.g., a steep slope extending across the imaginary plane 136 and a flat slope (e.g., at least substantially planar) at a center region, as reflected in FIG. 3. In various embodiments, the inner protrusion cavity 164 is the volume and/or space defined by the bottom surface 104 of the separator 106 and the imaginary plane 136. In various embodiments, the outer protrusion cavity 162 is the remainder of the protrusion cavity 128 that is not part of the inner protrusion cavity 164 (outside of the separator 106). For example, in various embodiments, the outer protrusion cavity 164 is the volume or space defined by the protrusion 130, the bottom surface 104 of the separator 106, and, possibly, the imaginary plane 136. In an example embodiment, the inner protrusion cavity 164 is open to the remainder of the inner cavity 166 such that anode electrode material 116 can enter and/or exit the inner protrusion cavity 164 from and/or into the remainder of the inner cavity 166 (e.g., the portion of the inner cavity 166 defined by the cylindrical separator wall 126, the imaginary plane 136, and, possibly, a portion of the bottom surface 104 has not crossed the imaginary plane 136).

In an example embodiment, the volume of the inner protrusion cavity 164 constitutes up to 25% of the volume of the protrusion cavity 128. In another example embodiment, the volume of the inner protrusion cavity 164 constitutes 25-50% of the volume of the protrusion cavity 128. In another example embodiment, the volume of the inner protrusion cavity 164 constitutes 50-75% of the volume of the protrusion cavity 128. In another example embodiment, the volume of the inner protrusion cavity 164 constitutes at least 75% of the volume of the protrusion cavity 128.

The anode electrode material 116 expands during discharge. In various embodiments, the volume of the inner protrusion cavity 164 is configured and/or provided to enable the anode electrode material 116 to expand into the inner protrusion cavity 164 to prevent or minimize the amount of expanding pressure created on the cathode-anode interface of the cell 100 caused by the anode electrode material expansion 116 (as compared to a cell where the inner cavity is not partially within the pip protrusion cavity). For example, the volume of the inner protrusion cavity 164 is configured and/or selected to enable the expansion of the anode electrode material 116 in order to prevent and/or decrease (compared to a cell where the inner cavity is not partially within the pip protrusion cavity) the pressure applied to the cathode-anode interface of the cell 100 caused by the anode electrode material expansion 116. By providing a portion of the anode electrode material 116 within the inner protrusion cavity 164, the amount of anode electrode material 116 within the cell may be the same or greater than the amount of anode electrode material 116 within a cell where the inner cavity is not partially within the pip protrusion cavity, while providing the forementioned benefits of decreasing the amount of pressure placed on the cathode-anode interface as the cell discharges. For example, the anode electrode material 116 is able to expand into the inner cavity 166 (the total volume available for anode electrode material expansion constitutes at least a portion of the inner protrusion cavity 164, up to the total volume of the inner protrusion cavity 164 in embodiments where the amount of anode electrode material 116 in the cell is not increased as compared to a standard cell in which the inner cavity does not extend into the protrusion cavity 128.

In some embodiments, a material that fills the outer protrusion cavity 162 may electrically isolate the separator 106 from the closed end wall 148 of the can 102 (e.g., either through the inclusion of cathode electrode material 120 in the outer protrusion cavity 162, a layer or volume of electrically insulating material in the outer protrusion cavity 162, and/or the like). For example, in an example embodiment, the volume of the inner protrusion cavity 164 is approximately 95% of the volume of the protrusion cavity 128 and the remainder of the protrusion cavity 128 is filled with a material to insulate the separator from the closed end wall 148 of the can 102.

As shown in FIGS. 3 and 4, the outer protrusion cavity 162 is at least partially filled with cathode electrode material 120. For example, the cathode electrode material 120 may define one side of a cathode-anode interface (the cathode and anode being separated by the separator) with the anode electrode material 116, at the curved and/or convex bottom surface 104 of the separator 106. In an example embodiment, cathode electrode material 120 may be packed into the outer protrusion cavity 162 (e.g., provided into the can as loose cathode electrode material and then tamped or compressed into the protrusion cavity to have a desired interfacial shape). For example, a tablet of cathode electrode material 120 may be positioned and/or disposed within the outer protrusion cavity 162.

In various embodiments, a tablet of cathode electrode material 120 is a solid form of cathode electrode material that is configured to hold its shape. For example, a tablet of cathode electrode material 120 may be molded or otherwise formed so as to conform to the size and/or shape of the outer protrusion cavity 162. For example, the tablet may be pre-formed and inserted into the outer protrusion cavity 162. In another example embodiment, cathode electrode material 120 is added into the outer protrusion cavity 162 and then compacted within the outer protrusion cavity using, for example, a mandrel. In an example embodiment, the tablet of cathode electrode material 120 is sized and/or shaped to substantially fill the outer protrusion cavity 162 (e.g., the tablet may be sized and/or shaped to conform to the interior shape and/or dimensions of the protrusion 130 and/or the outer shape and/or dimensions of the bottom surface 104). In an example embodiment, the tablet of cathode electrode material 120 only partially fills the outer protrusion cavity 162.

In various embodiments, the outer protrusion cavity 162 is partially filled with air, electrolyte, another substantially electrically insulating material, and/or hydrogen getters. Hydrogen getters are substances capable of absorbing hydrogen under low pressure (e.g., less than 1 atm). Some limiting examples of hydrogen getters include polymers containing a double or triple-bonded hydrocarbon such as polybutadience or polyisoprene and hydrogen-absorbing alloys. In an example embodiment, the hydrogen getters are in solid form and could be compressed into the pip protrusion 130 (e.g., using a mandrel or other press). In certain embodiments, a vacuum or low-pressure space is formed in the outer protrusion cavity 162 to electrically insulate the separator from the cell can.

By including anode electrode material within a volume of the protrusion cavity, electrochemical cell 100 includes more anode electrode material than prior art battery 10 designs. In various embodiments, the electrochemical cell 100 includes an amount of anode electrode material such that the expanded volume of the anode electrode material during discharge is less than or equal to the volume of the inner cavity 166. The anode electrode material 116 is therefore able to expand by the amount of additional volume provided by the inner protrusion cavity 164 without increasing the pressure on the cathode-anode interface and without decreasing the amount of anode electrode material within the electrochemical cell 100 (e.g., compared to the amount of anode electrode material within the battery 10).

Example Method of Manufacture

FIG. 5 provides a flowchart illustrating example processes and procedures that may be used to manufacture a cell 100 in accordance with example embodiments. Starting at block 502, the protrusion cavity 128 may be at least partially filled with cathode electrode material 120 (and/or hydrogen getters, or substantially electrically insulating material). In various embodiments, the cathode electrode material 120 may be inserted and/or disposed within the can 102 by at least partially filling the protrusion cavity 128 with cathode electrode material 120.

For example, in an example embodiment, a pre-formed tablet comprising cathode electrode material 120 may be inserted into the protrusion cavity 128 to partially fill the protrusion cavity 128 (e.g., at least partially fill the portion of the protrusion cavity 128 that will be the outer protrusion cavity 162) with cathode electrode material 120. In an example embodiment, the pre-formed tablet may be cylindrical- or truncated cone-shaped. In an example embodiment, the pre-formed tablet is shaped so as to fill the portion of the protrusion cavity 128 that will be the outer protrusion cavity 162. For example, the pre-formed tablet may be shaped to match the internal contours of the protrusion cavity 128. For example, the outer diameter of the tablet is configured to provide an interference fit with the internal diameter of pip protrusion 130.

In various embodiments, cathode electrode material 120 may be used to at least partially fill the protrusion cavity 128 by filling the protrusion cavity 128 with the cathode electrode material 120. For example, the material may be a free flowing material (e.g., a powder, a granular material, and/or the like). The material may then be tamped using, for example, a rod that is shaped to the area at the base 129 of the protrusion cavity 128 to pack and/or compress the material comprising the cathode electrode material 120 into the protrusion cavity 128. In another example, the cathode electrode material 120 is compressed into the protrusion cavity 128 using a rod having an end that mimics the contours of the exterior of the bottom surface 104 of the separator 106.

In various embodiments, the cathode electrode material 120 may be mixed, sieved, compacted, granulated, and sieved again prior to dosing the cathode electrode material 120 into a mold used to pre-form the tablet or into the protrusion cavity 128. In an example embodiment, the cathode electrode material 120 is dosed into the protrusion cavity 128 as powder or granular material. The cathode electrode material 120 is vibrated, in an example embodiment, to settle the cathode electrode material in the protrusion cavity 128. The cathode electrode material 120 is then compressed or tamped to unify the granular material into a tablet adhered to the surface of the protrusion cavity 128. In an example embodiment, the compression or tamping of the cathode electrode material 120 into the protrusion cavity 128 simultaneously with a post-compaction process that also compresses the portion of the cathode electrode material 120 within the main portion of the can 102.

At block 504, an electrode material ring comprising cathode electrode material 120 is formed within the can 102.

Once the protrusion cavity 128 is partially filled with cathode electrode material 120, the portion of the can 102 that will form the outer cavity 168 upon insertion of the separator 106 into the can is at least partially filled with cathode electrode material 120. For example, an electrode material ring comprising cathode electrode material 120 may be formed in the can 102. For example, in an example embodiment, one or more pre-formed rings and/or a hollow cylinder comprising cathode electrode material may be inserted into the can 102. For example, the pre-formed rings and/or hollow cylinder may comprise a central opening, core, or void, 165 that is sized to receive the separator 106 therein. In an example embodiment, the pre-formed tablet and the pre-formed rings and/or hollow cylinder may be a single pre-formed insert comprising cathode electrode material 120. In an example embodiment, after the protrusion cavity 128 is partially filled with cathode electrode material 120, cathode electrode material 120 may be impact molded into a cylindrical ring against the internal surface 156 of the can 102. For example, the cylindrical ring may have a central opening sized to receive the separator 106 therein.

In various embodiments, the can 102 may initially be entirely filled with a material comprising cathode electrode material 120. For example, a free flowing material comprising cathode electrode material 120 may be used to fill the can 102. The material may then be impact molded by being compacted into the can so as to form a cathode-packed can, for example. The cathode electrode material 120 may be impacted molded into the final ring shape with a central opening, core, or void 165 of the cathode-packed can 102 may be drilled out after molding so as to provide space for insertion of the separator 106 and anode electrode material 116. For example, the packed cathode electrode material 120 may be removed from a central core of the cathode-packed can so as to form the electrode material ring and provide space for insertion of the separator 106 into the can 102. For example, the central core may be sized to receive the separator 106 therein. In an example embodiment, the cathode electrode material comprises cathode material.

In various embodiments, the cathode electrode material 120 used to form the can 102 may be formulated differently from the cathode electrode material 120 in the protrusion 130. For example, the cathode electrode material 120 disposed in the protrusion 130 includes less conductive additive than the cathode electrode material 120 disposed on the main portion of the can 102.

In an example embodiment, the electrode material ring formed of cathode electrode material 120 is formed prior to the insertion and compaction of cathode electrode material into the protrusion cavity 128. For example, step 504 is performed step 502 in an example embodiment.

In an example embodiment, after the performance of steps 502 and 504 such that electrode material ring and pellet of cathode electrode material 120 are formed and/or inserted in the can 102 and protrusion cavity 128, respectively, the can 102 may inverted (e.g., such that the open first end 150 of the can 102 is facing downward) and/or the interior of the can 102 is subjected to suction remove any non-compressed, non-adhered, loose cathode material from the interior of the can 102 prior to the insertion of the separator 106 and anode electrode material 116.

After these steps, the entire can/cathode assembly could be inverted or subject to suction to remove any non-compressed, non-adhered, loose cathode material (prior to separator and anode insertion).

In various embodiments, once the protrusion cavity 128 and the region within the can 102 that will form the outer cavity 168 of the can 102 are at least partially filled with cathode electrode material 120, the separator 106 may be inserted into the cathode ring (e.g., the central core) at block 506. In an example embodiment, inserting the separator 106 into the electrode material ring places an exterior surface of the cylindrical separator wall 126 in contact with cathode electrode material 120. For example, in an example embodiment, an insertion rod used to insert the separator 106 may include a tip that is contoured to the desired shape of the bottom surface 104 of the separator 106. In an example embodiment, a vibration or centrifuging of the cell 100 may be used to cause the bottom surface 104 of the separator 106 to have the desired curved and/or convex shape. In an example embodiment, inserting the separator 106 into the electrode material ring places the curved and/or convex exterior surface of the bottom surface 104 of the separator 106 into contact with the cathode electrode material 120 disposed within the protrusion cavity 128. For example, inserting the separator 106 into the electrode material ring causes the protrusion cavity 128 to be divided into the outer protrusion cavity 162 and the inner protrusion cavity 164.

At block 508, the anode electrode material 116 may be added into the inner cavity 166 of the can 102. In various embodiments, the anode electrode material at least partially fills the inner cavity 166, including the inner protrusion cavity 164. The added weight of the anode electrode material within the interior of the separator 106 presses the separator 106 to at least partially contour to the shape of the cathode electrode material within the protrusion cavity. The anode electrode material may flow (e.g., as a gel) to contour to the resulting shape of the separator 106. For example, anode electrode material may be added into the inner cavity 166 such that at least a portion of the anode electrode material is disposed within the protrusion cavity 128. In various embodiments, the anode electrode material comprises anode material and/or electrolyte material. In various embodiments, at least one of the anode material and/or electrolyte material comprises zinc oxide (ZnO) and/or zinc hydroxide $(Zn(OH)_2)$. In an example embodiment, the viscosity and/or weight of the anode electrode material 116 forces the bottom surface 104 of the separator 106 to conform to the curved and/or convex surface of the pellet of cathode electrode material 120 and/or hydrogen getters disposed in the protrusion cavity 128 to form the curved and/or convex shape of the bottom surface 104.

At block 510, the current collector 108 may be inserted into the inner cavity 166 and the first end 150 of the can 102 may be sealed using the seal 112 and second contact terminal or cover 114 to form the cell 100. For example, once the separator is inserted into the inner cavity 166, the cylindrical separator wall 126 and the bottom surface 104 are both in contact with cathode electrode material 120.

In various embodiments, as a result of the curved and/or convex bottom surface 104 of the separator 106 extending into the protrusion cavity 128, the volume of the inner cavity 166 is greater than a battery 10 that does not provide anode electrode material within the protrusion cavity 128. This enables a same or greater amount of anode electrode material to be disposed within the electrochemical cell 100 (e.g., compared to the battery 10) while reducing the pressure on the cathode-anode interface (compared to the battery 10). This provides improved and/or more reliable performance of the electrochemical cell 100 (compared to the battery 10).

In an example embodiment where the outer protrusion cavity 162 is at least partially filled with first electrode material, the interfacial surface area between the anode and cathode of the cell 100 is increased compared to the interfacial surface area between the anode and cathode of the battery 10. The increase in interfacial surface area between the anode and the cathode of cell 100 is capable of providing increased efficiency in discharge of the cell 100 compared to the battery 10.

While embodiments described in detail herein relate to primary alkaline cells with a bobbin-style construction, various other embodiments are contemplated that include other bobbin-style cells and/or cells that reverse the location of the cathode and anode of the cell. For example, in an example embodiment, the cathode electrode material 120 is disposed within the inner cavity 166 and the anode electrode material 116 is disposed within the outer cavity 168 (and possibly in the outer protrusion cavity 162).

Many modifications and other embodiments of the embodiments set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An electrochemical cell comprising:
   a can comprising a cylindrical side wall extending from a closed end wall, the closed end wall defining a protrusion with a protrusion cavity therein;
   a separator positioned within the can and defining an inner cavity and separating the inner cavity from an outer cavity defined by the can and the separator, wherein the inner cavity extends into the protrusion cavity;
   a cathode electrode material disposed in the outer cavity; and
   an anode electrode material disposed in at least a portion of the inner cavity.

2. The electrochemical cell of claim 1, wherein the separator comprises a bottom surface that extends into the protrusion cavity.

3. The electrochemical cell of claim 2, wherein the bottom surface of the separator is convex to extend into the protrusion cavity.

4. The electrochemical cell of claim 2, wherein the bottom surface of the separator divides the protrusion cavity into an inner protrusion cavity and an outer protrusion cavity.

5. The electrochemical cell of claim 4, wherein the inner protrusion cavity is part of the inner cavity.

6. The electrochemical cell of claim 4, wherein the cathode electrode material is disposed in the outer protrusion cavity.

7. The electrochemical cell of claim 4, wherein hydrogen getters are disposed within the outer protrusion cavity.

8. The electrochemical cell of claim 1, wherein the cathode electrode material comprises cathode material and the anode electrode material comprises anode material and electrolyte material.

9. The electrochemical cell of claim 8, wherein at least one of the anode material or the electrolyte material comprises zinc oxide (ZnO) and/or zinc hydroxide (Zn(OH)$_2$).

10. An electrochemical cell comprising:
   a can comprising a first cylindrical side wall extending from a closed end wall, the closed end wall defining a protrusion with a protrusion cavity therein;
   a separator positioned within the can comprising a bottom surface defined by a bottom surface wall, the bottom surface wall being convex to extend into the protrusion cavity, wherein the separator defines an inner cavity and separates the inner cavity from an outer cavity defined by the can and the separator, and wherein the inner cavity extends into the protrusion cavity;
   a cathode electrode material disposed in the outer cavity; and
   an anode electrode material disposed in at least a portion of the inner cavity.

11. The electrochemical cell of claim 10, wherein the bottom surface of the separator divides the protrusion cavity into an inner protrusion cavity and an outer protrusion cavity.

12. The electrochemical cell of claim 11, wherein the inner protrusion cavity is part of the inner cavity.

13. The electrochemical cell of claim 12, wherein the cathode electrode material is disposed in the outer protrusion cavity.

14. The electrochemical cell of claim 12, wherein hydrogen getters are disposed within the outer protrusion cavity.

15. The electrochemical cell of claim 10, wherein the cathode electrode material comprises cathode material and the anode electrode material comprises anode material and electrolyte material.

16. The electrochemical cell of claim 15, wherein at least one of the anode material or the electrolyte material comprises zinc oxide (ZnO) and/or zinc hydroxide (Zn(OH)$_2$).

17. The electrochemical cell of claim 10, wherein the inner cavity extends into the protrusion cavity.

18. A method for manufacturing an electrochemical cell, the method comprising:
   providing a can comprising a cylindrical side wall extending from a closed end wall, the closed end wall comprising a protrusion with a protrusion cavity therein;
   inserting cathode electrode material into the can to form a cathode electrode material ring;
   inserting a separator into the cathode electrode material ring, the separator comprising a convex bottom surface that extends into the protrusion cavity;
   placing anode electrode material into an inner cavity defined by the separator, wherein the inner cavity extends into the protrusion cavity; and
   sealing a first end of the can opposite the closed end wall.

19. The method of claim 18, wherein some of the cathode electrode material partially fills the protrusion cavity and inserting the separator into the can causes both the convex bottom surface of the separator and a separator wall to be in contact with the cathode electrode material.

20. The method of claim 18, wherein the cathode electrode material comprises cathode material and the anode electrode material comprises anode material and electrolyte material and at least one of the anode material or the electrolyte material comprises zinc oxide (ZnO) and/or zinc hydroxide (Zn(OH)$_2$).

* * * * *